United States Patent [19]
Truchon et al.

[11] Patent Number: 6,144,723
[45] Date of Patent: *Nov. 7, 2000

[54] METHOD AND APPARATUS FOR PROVIDING VOICE ASSISTED CALL MANAGEMENT IN A TELECOMMUNICATIONS NETWORK

[75] Inventors: Francois Robert Truchon, Verdun; Louis C. Barbeau, St-Bruno de Montarville, both of Canada; Rohit N. Gupta, Plano, Tex.; Francois Groleau, Verdun, Canada

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 09/046,645

[22] Filed: Mar. 24, 1998

[51] Int. Cl.⁷ .................................................... H04M 3/487
[52] U.S. Cl. ..................................... 379/88.01; 379/88.04; 379/114; 379/207
[58] Field of Search ............................. 379/88.01–88.04, 379/88.21, 88.25, 242, 114, 111, 112, 113, 243, 245, 207; 455/564, 565

[56] References Cited

U.S. PATENT DOCUMENTS

| | | | |
|---|---|---|---|
| 4,979,206 | 12/1990 | Padden et al. | 379/88.01 |
| 5,297,183 | 3/1994 | Bareis et al. | 455/414 |
| 5,339,352 | 8/1994 | Armstrong et al. | 455/414 |
| 5,517,560 | 5/1996 | Greenspan | 379/114 |
| 5,561,706 | 10/1996 | Fenner | 455/406 |
| 5,659,597 | 8/1997 | Bareis et al. | 455/563 |
| 5,758,288 | 5/1998 | Dunn et al. | 455/456 |
| 5,774,802 | 6/1998 | Tell et al. | 455/408 |
| 5,796,790 | 8/1998 | Brunner | 455/406 |

*Primary Examiner*—Scott L. Weaver

[57] ABSTRACT

This invention provides a novel switch for use in a telecommunications network that is capable of interacting with a voice assisted services server, such as a voice activated dialing (VAD) server. The switch is configured to set-up a calling session between an originating terminal and the VAD server that creates a voice connection between the user at the originating terminal and the VAD server, the voice connection passing through the switch. The VAD server can then in response to a spoken utterance indicative of the party the user wishes to call, generate a transcription of the utterance and extract from a database the telephone number associated with this transcription. The VAD server then formulates a call session redirect message in which is embedded the telephone number of the party the user wishes to call. This call session redirect message is received by the switch and the command implemented such that the call session is redirected toward the desired location. After this procedure is completed, the connection between the switch and the VAD is released. The invention also extends to a novel voice assisted services server capable of remotely effecting call management at a switch based on a spoken utterance conveyed to the voice assisted services server over a voice connection. Further, the invention also extends to methods for operating a switch and a voice assisted services server to implement the above described functionalities. Yet, the invention also extends to a novel method and apparatus to effect billing operations allowing to differentiate for a single call session the part of the call session involving the voice assisted services server and the part following the call session redirect event.

27 Claims, 6 Drawing Sheets

METHOD AND APPARATUS FOR PROVIDING VOICE ASSISTED CALL MANAGEMENT IN A TELECOMMUNICATIONS NETWORK

FIELD OF THE INVENTION

The present invention relates to voice-assisted services provided in a telecommunication network. More specifically, the invention relates to methods and devices that allow a user to obtain desired services from the telecommunications network by uttering a request. In a particular example, the invention can be used to effect voice activated dialling (VAD). With such a system, the user utters an identifier of the party he/she wishes to call. Through speech processing the system recognizes the identifier and by use of a suitable database maps the identifier to a telephone number that is then automatically dialled. This avoids the necessity for the user to enter a telephone number manually on the key pad of his terminal.

BACKGROUND OF THE INVENTION

A typical voice activated dialing session involving a wireless or a landline terminal is normally initiated when the VAD subscriber at the terminal requests VAD services during its interaction with a serving Mobile switching Center (MSC). The serving MSC recognizes the request for voice processing and through signaling and control establishes a voice connection between a VAD server and the subscriber. Once the voice connection is established, the subscriber is prompted by the VAD server to give the name or number of the party with whom a connection is requested. The user utters the name or number of the party and the sound signal is relayed over the voice connection to the VAD server. The VAD server processes the spoken utterance by invoking a speech recognition layer which provides a transcription of the utterance, That transcription is then used to locate an entry in a database by mapping a global set of transcriptions that the user is susceptible to utter with corresponding telephone numbers. In a specific example, the user may say "Office" in response to the prompt issued by the VAD server. When valid speech is detected on the line, the VAD server invokes the speech recognition layer that processes the speech signal and determines that the user said "Office". The VAD then searches a database for that particular user to locate the entry "Office" and extract the telephone number associated with this entry. Once this information is found, the VAD server initiates a call session set-up process toward the location sought by the user by dialing the telephone number found in its database. The call session set-up may be effected through the MSC or through another switch in the network. Once the dialing process is completed and the call session is established the user can communicate with the called party through the voice connection passing through the VAD server. In fact, the VAD server becomes a link of the communication pathway through the network between the user and the called party. This is undesirable because during the entire duration of the call session, some resources of the VAD server cannot be used to service other subscribers. In addition, this prior art technique overrides any imposed user restrictions that may be placed in the user profile database on the MSC. Since call session completion toward the called party is effected without intervention from the MSC, the user profile database that may reside on the MSC and that contains information regarding the preferences or restrictions that the user has during his/her use of the network are not implemented. In a specific example, if the user profile is set up to preclude long distance calls, this restriction cannot be enforced when the VAD server dials the called party since the VAD server has no knowledge of the user profile data.

During the process described above, the MSC normally creates billing records to keep track of the usage made by the user of the communications network so the telephone company can bill the user accordingly. Existing billing practices are set-up such that the user is not charged for the cost of the call session involving the VAD services. This implies that the telephone company must filter the billing records to identify those during which the VAD has been invoked and alter them to remove the component relating to the VAD interaction. This task may not be easy to perform and considerable resources must be devoted to properly track and filter the billing records.

Thus, there exists a need in the industry to provide a method and an apparatus for providing voice assisted services that alleviate the problems associated with prior art devices.

OBJECTIVES AND SUMMARY OF THE INVENTION

An object of this invention is to provide an improved switch for a telecommunications network capable of interacting with a voice assisted services server, such as a VAD server.

Another object of this invention is to provide a novel voice assisted services server for a telecommunications network capable of performing desired actions in response to spoken requests.

Another object of this invention is to provide a novel method for call session management involving a voice assisted services server.

Yet another object of this invention is to provide a novel method and apparatus for generating billing data for usage of a telecommunications network resources involving a voice activated services server.

As embodied and broadly described herein, the invention provides a switch for use in a telecommunications network, said switch including:

an input through which a call session originating at an originating terminal in the telecommunications network can be established permitting the transport of voice signals;

an output through which the call session established through said input can be routed toward a voice assisted services server;

said switch being responsive to the voice assisted services server to manage the call session in dependence upon a call session management output signal issued by the voice assisted services server.

In a preferred embodiment, the switch implementing this inventive principle is configured to process the incoming call session at its input from the originating terminal in the network in a manner that involves standard call session set-up procedures, such as user authentication, etc. In a specific example, the switch may be part of a switching center such as an MSC (mobile switching center designed for handling call sessions involving wireless terminals). The MSC has a distributed structure and includes, in addition to the switch, remote databases that provide the necessary information to the switch to enable the latter to properly process calls. Each of those databases has a storage medium containing the necessary data and also a limited data processing capability to effect data exchange with the switch and also to effect some signal processing functions. When the switch receives the signal arriving at the input, a trigger indicative of a voice assisted services server processing is generated and the call session, after the necessary validation procedures is set-up through the output of the switch with the voice assisted services server.

The voice assisted services server is a component of the network that is designed to perform a predetermined action in response to a spoken request. In a specific example, the voice assisted services server may be a VAD server that recognizes the utterance spoken by the user that identifies the party that the user wishes to call, and retrieves from an internal database the identifier of the called party that can be processed by the switch to effect call session redirection. This identifier would normally be the telephone number of the party that the user is desirous of calling.

Once a voice connection is established between the output of the switch and the voice assisted services server, such as a VAD server, the latter receives the utterance spoken by the user at the originating terminal and processes the utterance to generate a transcription representative of the meaning of the utterance. This transcription will then be used by the VAD server to access a database and extract the entry corresponding to the transcription. That entry contains the telephone number associated with the transcription.

On the basis of the telephone number, the VAD server builds a call session management signal that is conveyed to the switch. In a simple form, the call session management signal contains the telephone number retrieved by the VAD server on the basis of the spoken utterance. The switch then redirects the existing call session toward the new destination. Also, the switch terminates the connection with the VAD server, thus releasing its resources.

The call session redirect procedure is a method, during which the switch steps back over the various stages of the original translation process that was effected to set-up the call session made to establish the connection originating terminal/VAD server. A new call session set-up is then initiated this time using the telephone number obtained from the VAD server. This means that a new translation process is effected at the switch based on the telephone number obtained from the VAD server. In other words, the call session redirect procedure has the same effect as if the user himself has dialled the number on the key pad of the originating terminal. This brings about a number of advantages. First, any call session preferences or restrictions can be enforced on the redirect procedure since those are invoked in the same manner as any other call the user is susceptible to make. Thus, if the user is precluded from making long distance calls this interdiction will be noted during the call session set-up when the redirect is made and the call session will be aborted. Secondly, the generation of the billing records is simplified as a first billing record is generated for the portion of the call session during which the VAD is invoked and a new billing record is generated for the portion of the call session following the call session redirect event. The first billing record can be easy to identify since it includes an identifier that specifies the VAD interaction. For instance, this identifier may be the code entered on the originating terminal to invoke the VAD services. In a specific example, this code may be "#" followed by "SEND". This feature greatly facilitates the billing process since the part of the call session involving the VAD services that normally is not billed to the user is reflected in a unique billing record, while the part of the call session to be charged to the user is reflected in a separate billing record. This allows the telephone company to easily identify which billing record should be cancelled and which is to be charged to the user.

As embodied and broadly described herein, the invention also provides a voice assisted services server for use in a telecommunications network, said voice assisted services server including:

an input through which a call session originating at an originating terminal in the telecommunications network can be established permitting the transport of voice signals;

said voice assisted services server being responsive to a spoken utterance formulated at the originating terminal to generate a call session management output signal, said signal being usable by a switch of the telecommunications network associated with the call session to manage the call session in dependance of said call session management output signal.

As embodied and broadly described herein, the invention also provides a switching center for use in a telecommunications network, said switching center including:

an input through which a call session originating at an originating terminal in the telecommunications network can be established permitting the transport of voice signals;

a first output through which the call cession established through said input can be routed toward a voice assisted services server;

a second output through which the call session can be re-directed toward another destination in the telecommunications network;

processing means for generating a first billing record for a section of the call session associated with the voice assisted services server and a second billing record for a section of the call session associated with the another destination; and a computer readable storage medium for recording said first billing record and said second billing record.

As embodied and broadly described herein, the invention also provides a method for management of calls involving voice activated dialing services:

establishing a first voice connection between an originating terminal in a telecommunications network and a switch of the telecommunications network;

establishing a second voice connection between said switch and a voice activated dialing server;

establishing a signaling connection between said switch and said voice activated dialing server;

processing at said voice activated dialing server a voice signal representative of a spoken utterance formulated at said originating terminal and transported to said voice activated dialing server over said first and second voice connections to generate on the basis of the spoken utterance an identifier of a destination terminal in the telecommunications network a user at said originating terminal is desirous of calling;

transmitting said identifier over said signaling connection toward said switch;

processing said identifier at said switch to establish a third voice connection between said switch and the destination terminal, thereby allowing transport of voice signals between said originating terminal and said destination terminal;

releasing said second voice connection.

As embodied and broadly described herein, the invention also provides a method for managing a call session involving voice assisted services, said method comprising the steps of:

establishing a call session between an originating terminal in the telecommunications network and a voice assisted services server, said call session being managed by a switch in the telecommunications network;

generating at said voice assisted services server on a basis of a spoken utterance formulated at said originating terminal a call session management signal indicative of a call session management event to be implemented at said switch;

transmitting to said switch said call session management signal;

managing said call session in dependance upon said call session management signal.

As embodied and broadly described herein the invention also provides a method for remotely managing a call session under the control of a switch in a telecommunications network, said call session being established from an originating terminal in said telecommunications network, said method comprising the steps of:

receiving at a location remote from said switch a voice signal representative of a spoken utterance formulated at said originating terminal;

processing said voice signal at said location to generate a call session management signal indicative of a call session management event to be implemented at said switch, said signal being usable by said switch to effect managing of said call session in dependance upon said call session management signal.

As embodied and broadly described herein, the invention also provides a method for generating billing data regarding usage of a telecommunications network during a call session, said method comprising the steps of:

establishing a call session between an originating terminal and a voice assisted services server permitting a user at said originating terminal to interact with said voice assisted services server;

generating a first billing record for a portion of said call session involving said voice assisted services server;

redirecting said call session toward a destination other than said voice assisted services server;

generating a second billing record for a portion of said call session involving said destination other than said voice assisted services server.

DESCRIPTION OF A PREFERRED EMBODIMENT

Figure 1:
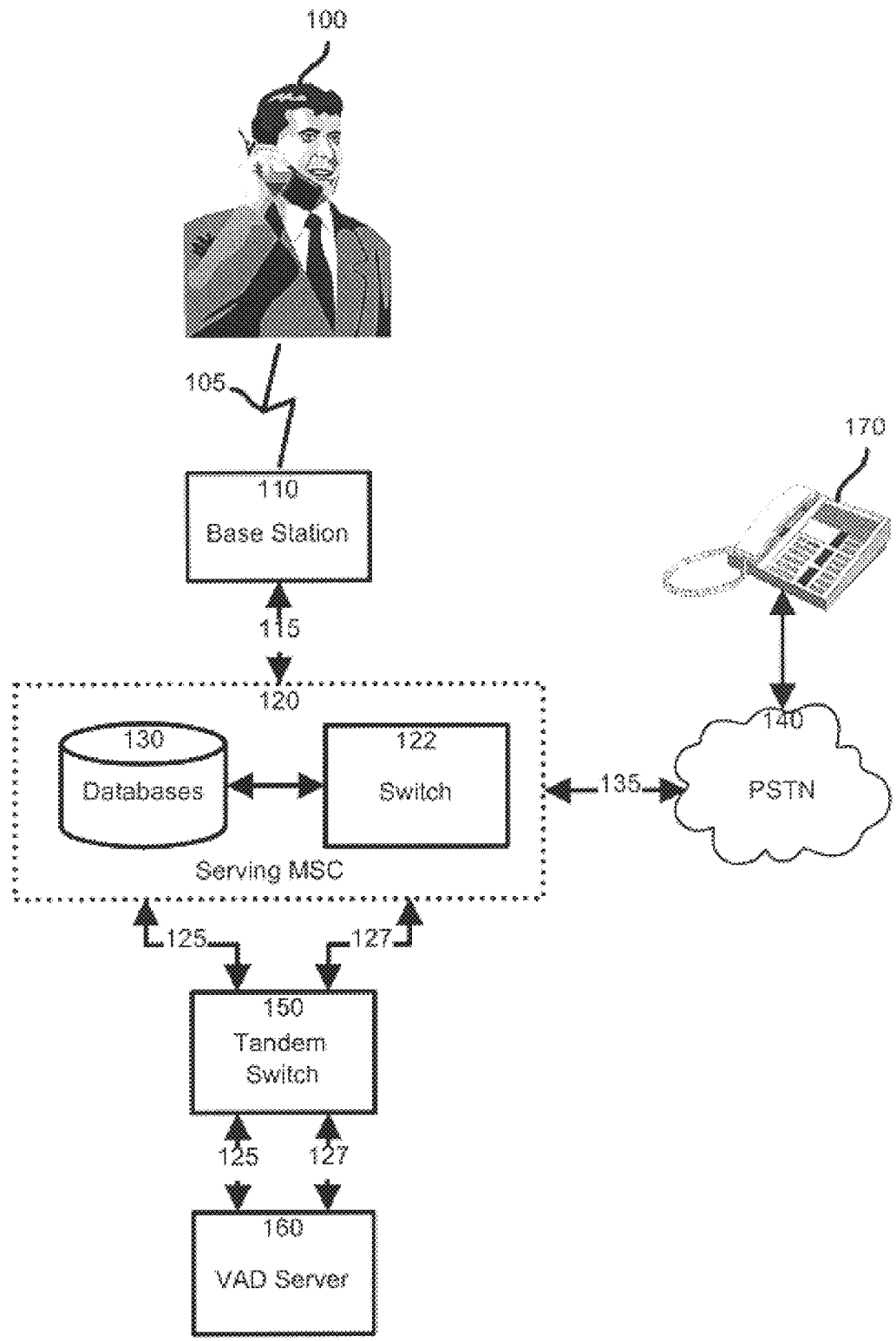
FIG. 1 is a block diagram illustrating a telecommunications network and its components.

FIG. 1 is a block diagram illustrating a telecommunication network and its components. A mobile terminal 100 is connected to a base station 110 through a wireless link 105. The base station 110 is connected to the serving Mobile switching Center (MSC) 120 via link 115. Link 115 provides voice and signaling capabilities. Protocols often used for this link are from the well-known X.25 suite of protocols.

The serving MSC 120 is connected to the Public switched Telephone Network (PSTN) 140 through link 135. The serving MSC 120 comprises a switch 122 and a plurality of databases 130. A communications link is provided between the switch 122 and the databases 130 to permit the exchange of data. The switch 122 and the databases 130 will be further described in FIG. 2 below. Link 135 comprises many voice channels as well as at least one signaling channel (i.e., SS7/ISUP). SS7 (for Signaling System 7) is the signaling network (separate from the voice network) that is used for connecting telephone calls. The SS7 protocol is fully described in the American National Standards Institute (ANSI) document entitled "ANSI T1.110-Telecommunications Signaling System No. 7 (SS7)—General Information". The International Telecommunications Union Telecommunications Standardization Sector (ITU-TSS) also publishes a set of standards for SS7. They are known as the ITU-TSS Q-7XX series. ISUP (for ISDN (Integrated Services Digital Network) User Part) is the fourth level in the four level SS7 protocol suite. ISUP is fully described in "ANSI T1.113-Telecommunications Signaling System No. 7 (SS7)—Integrated Services Digital Network (ISDN) User Part (ISUP)" and in ITU-TSS Q-761 to Q-767. These documents are incorporated herein by reference.

The serving MSC 120 can be further connected to a VAD server 160 via one or more tandem switches such as tandem switch 150 and a voice connection 125 and a SS7 signaling connection 127. The tandem switch 150 is in fact another MSC and is not necessary in all cases. Note that a VAD server is only one example of a voice-assisted services server.

Figure 2:
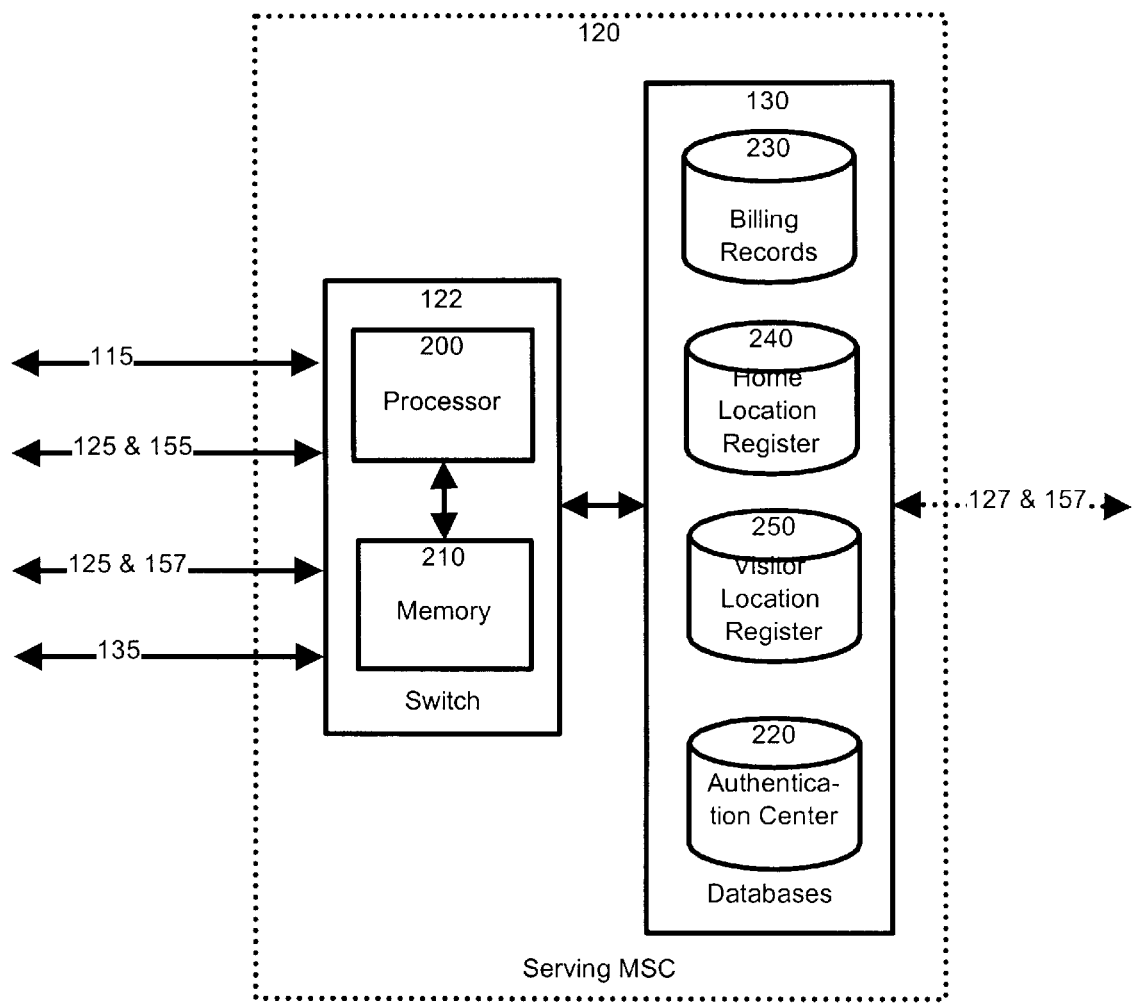
FIG. 2 is a block diagram illustrating in further detail the components of a serving MSC shown in FIG. 1, constructed in accordance with an embodiment of the invention.

FIG. 2 is a block diagram illustrating in further detail the components of the serving MSC 120. The serving MSC 120 comprises a switch 122 and a group of databases 130. The switch 122 includes a processor 200 and a memory 210. The databases 130 may include an authentication center database 220, a billing records database 230, a home location register database 240, and a visitor location register database 250. Inputs and outputs to the switch 122 are a voice and signaling connection 115 to/from a base station 110, a voice connection 125 to the VAD server 160 (that may pass through a tandem switch 150), a signaling connection 127 to the VAD server 160 (that may also pass through a tandem switch 150), and a voice and signaling connection 135 to the PSTN 140. Depending on the type of call and the type of data being processed, the databases may also be designed to transfer data on the SS7 connection 127 and 157 and thus assist in the signaling functions.

The processor 200 executes computer programs stored in memory 210. It is responsible for controlling information coming in and going out of the serving MSC 120 as well as all controlling all information circulating inside the serving MSC 120. In addition to storing computer programs, the memory 210 may act as a buffer for storing data on a temporary basis.

The authentication center 220 will interact with the home location register 240 and the visitor location register 250 to verify the identity of any mobile terminal user on the serving MSC's (120) territory and authorize the use of the telecommunication network. The billing records database 230 simply stores all information related to the billing of calls. This information is later accessed to produce client invoices. The home location register 240 keeps track of all mobile users that subscribed to the mobile services of its area and who are on its territory at any given time. The home location register 240 also holds information related to the wireless user's preferences and restrictions such as long distance restriction, caller identification, voice mail box options, passwords, voice activated-dialing origination trigger, etc. The visitor location register 250 keeps track of all mobile users on its territory who originally subscribed to mobile services in an area serviced by another MSC. Finally, the data bus 270 provides a pathway for all data circulating inside the serving MSC 120.

Figure 3:
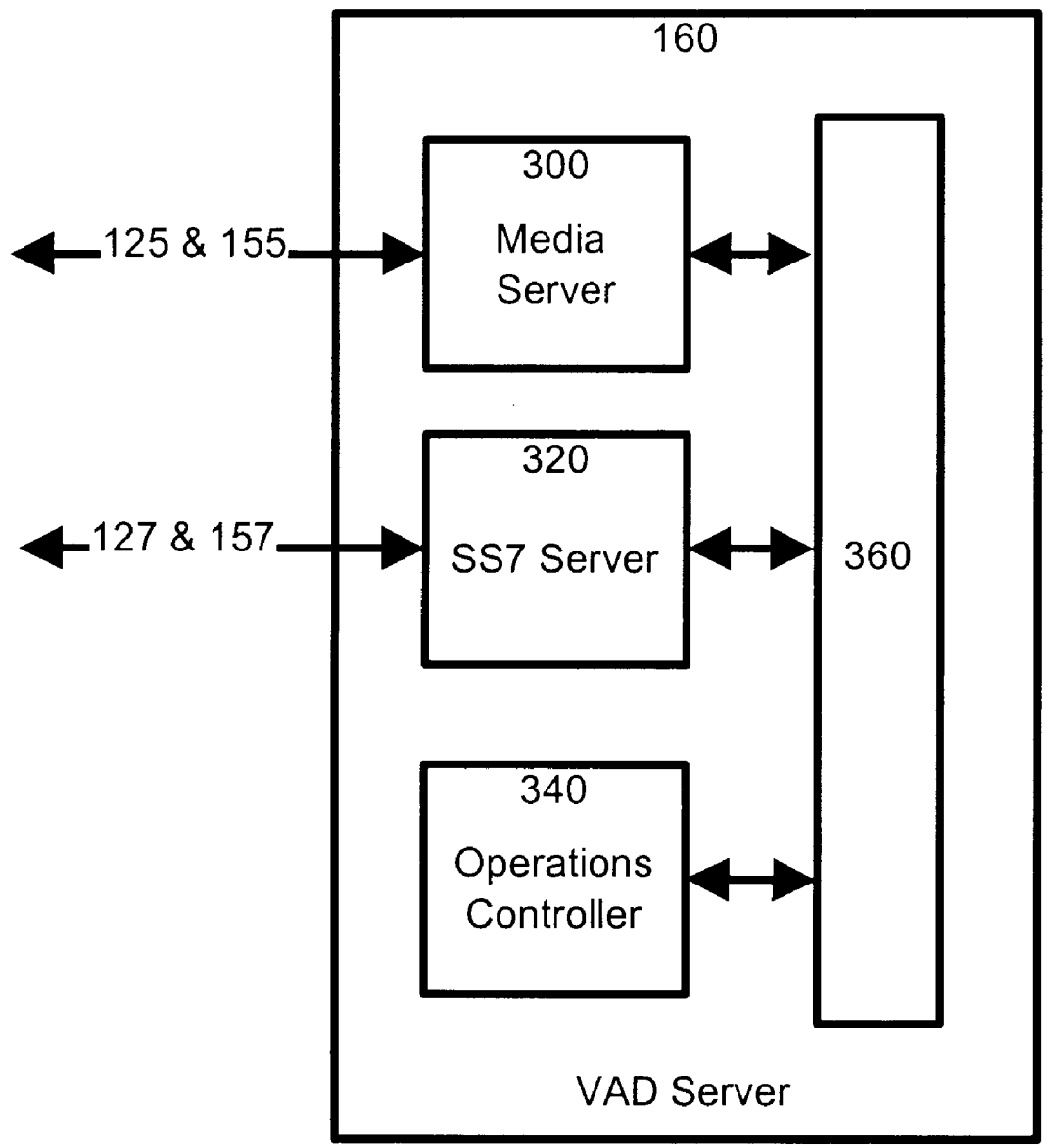
FIG. 3 illustrates the main components of a VAD server shown in FIG. 1, constructed in accordance with an embodiment of the invention.

FIG. 3 illustrates the main components of a VAD server 160 in accordance with an embodiment of the invention. A VAD server 160 provides the following functionalities: service logic; voice connection to the wireless network; SS7 connectivity for ISUP signaling and IS-41 messaging; speech signal processing; subscriber data storage; operations, administration, maintenance and provisioning (OAM&P); and Local Area Network (LAN).

The main components of the VAD server 160 are media server 300, SS7 Server 320 and operations controller 340. Inputs and outputs to the VAD server are the voice connection 125 to the serving MSC 120 and the signaling connection 127 to the serving MSC 120.

The VAD server 160 may include one or more media servers 300. The media server 300 is the main service providing subsystem in the VAD server 160. It is a multi-processor system that can include digital signal processing cards, DS1 networking cards, a voice channel switching card, hard disk drives, and general computing cards. The media server 300 supports the required application logic, the subscriber-data storage (i.e., for VAD directories), and speech-recognition hardware and software. Furthermore, the VAD dialing and programming capabilities are deployed together on the media server 300.

The VAD server 160 may include one or more SS7 Servers 320. The SS7 Server 320 provides connectivity to the wireless operating company SS7 network for ISUP signaling an IS-41 messaging. In an embodiment of the invention, the SS7 Server 320 may include a PowerPC (TM) processor system running the IBM proprietary AIX operating system and that includes a SS7 input/output controller card and associated transition modules providing SS7 connectivity. They provide routing software that handles incoming IS-41 Origination Request (ORREQ) messages. Based on the caller's subscriber group, the SS7 Server 320 determines, by using a local table, the Directory Number (DN) of the appropriate media server 300 in the IS-41 Origination Request Return Result (orreq) message.

The operations controller 340 is responsible for centralizing OAM&P functions in the VAD server 160. The operations controller 340 is a multi-processor system that can include a general computing card, serial data (RS-232) input/output cards, hard disk drives, and a tape drive. Furthermore, the operations controller 340 provides the operating company with interface for remote OAM&P.

The media server 300 is connected to the voice connection 125 and the SS7 Server 320 is connected to the SS7 network connection 127.

The VAD server 160 is also provided with a data bus 360. The data bus may be comprised of Ethernet hubs, which provide a local data network that interconnect all components of the VAD server 160 and that may also be used to access external computer systems, The data exchange across the network includes ISUP-related messages, OAM&P data, subscriber data updates and speech data.

Figure 4A:
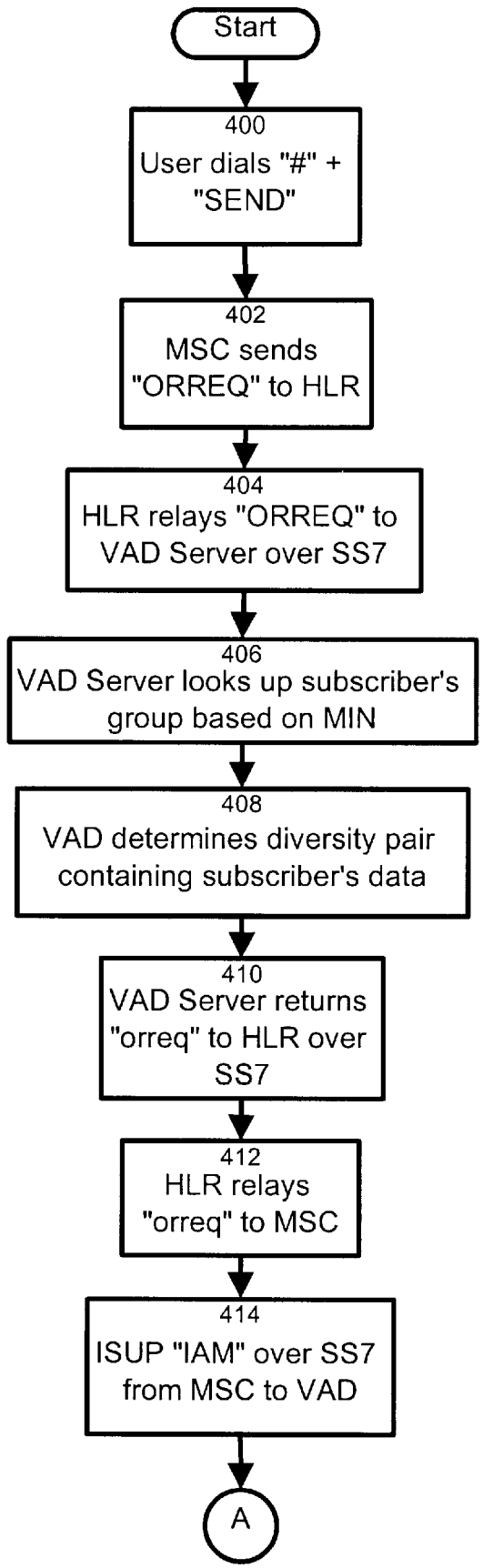
FIGS. 4a, 4b and 4c is a flowchart illustrating the various steps of a method of providing a voice-activated dialing service according to an embodiment of the invention.
Figure 4B:
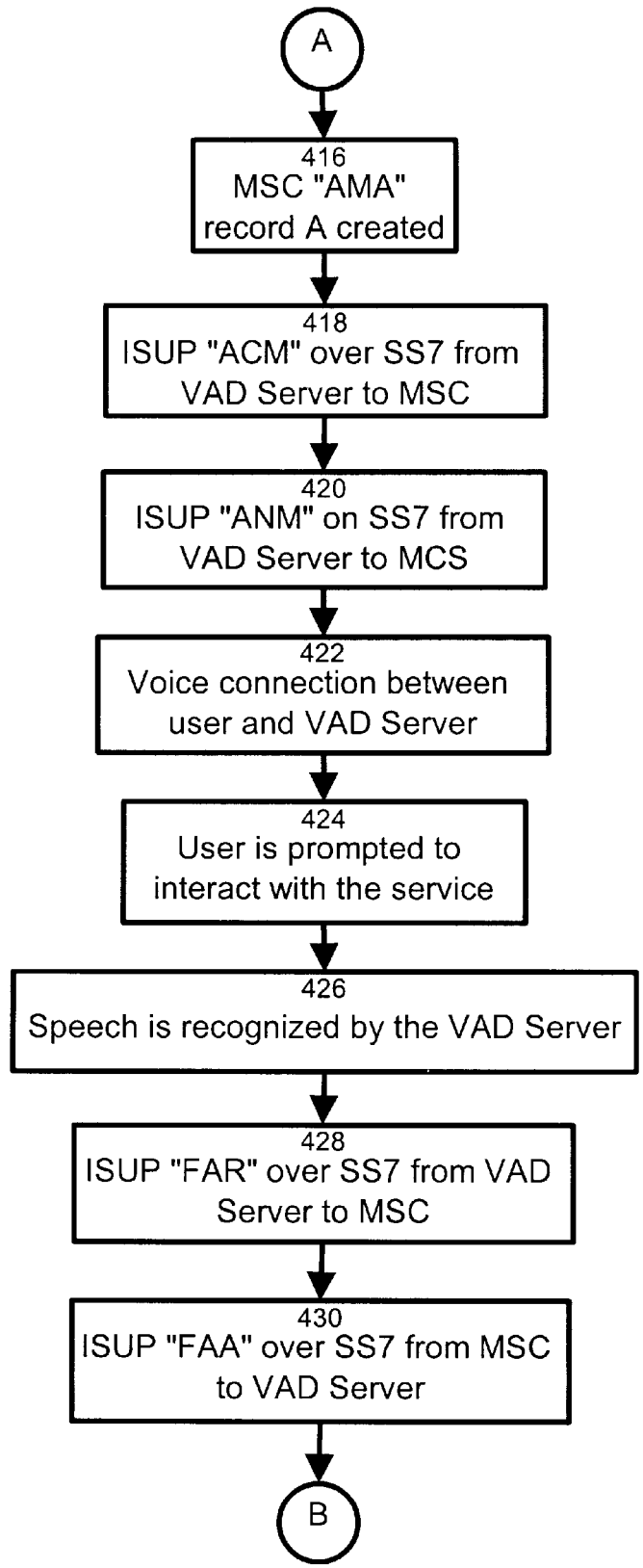
Figure 4C:
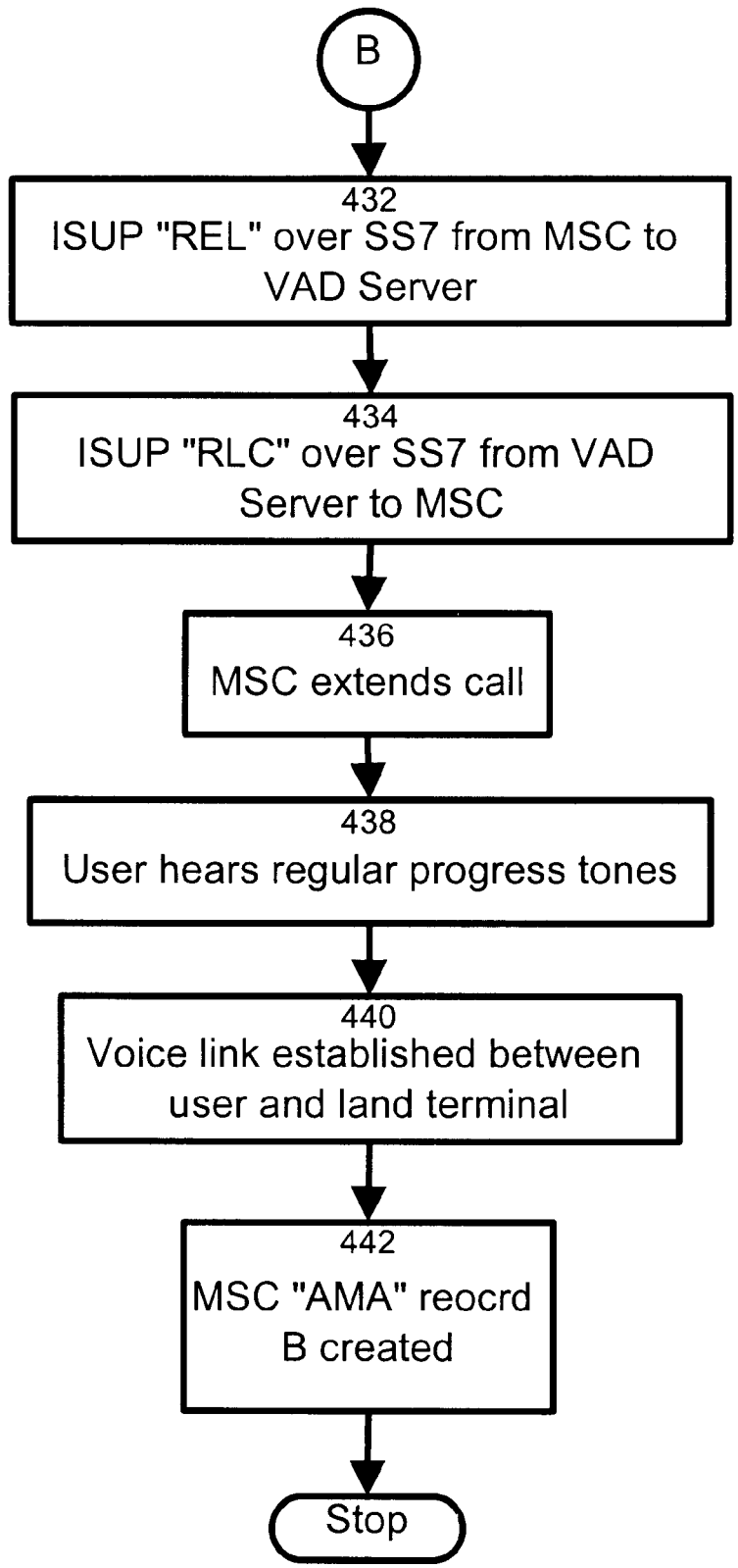

FIGS. 4a, 4b and 4c is a flowchart of a method illustrating the operation of the system in accordance with a preferred embodiment of the invention. This method is, of course, preceded by the usual identification and authentication of the user 100. At step 400, the VAD user's 100 dials the "#" key followed by the "SEND" key. At step 402, a trigger in the serving MSC 120 results in an IS-41 "ORREQ" message being sent to the subscriber's home location register 240. Based on the nature of the trigger, in this case a "#" trigger, the home location register 240 relays the "ORREQ" message over the SS7 connection to the VAD server 160 (via the Tandem switch 150, if necessary) (step 404). At step 406, the VAD server 160 receives the IS-41 "ORREQ" message and looks up the subscriber's group based on the Mobile Identification Number (MIN) included in the "ORREQ". A local table in one of the SS7 server 320 is used to resolve which media server 300 contains the VAD data for this subscriber, based on the subscriber group (step 408). The VAD server 160, at step 410, returns an origination request return result ("orreq") to the home location register 240 over the SS7 network 127 and 157. The "orreg" message includes a Directory Number (DN) that identifies the diversity pair that contains the VAD subscriber data. The home location register 240 relays the "orreq" message to the MSC processor 200 (step 412). At step 414, the MSC 120 notifies the VAD server 160 of an incoming call by sending an ISUP Initial Address Message ("IAM") over the SS7 network 127 and 157.

The "IAM" provides the distant exchange with the calling and called party numbers, as well as information regarding the availability of SS7 signaling, whether or not the ISUP protocol is required end to end, and the type of network signaling available (if SS7 is not used throughout the network). The "IAM" also indicates whether or not further information will be available using subsequent messages.

At step 416, the MSC 120 creates billing record A and stores it in the billing records database 230. At step 418, the VAD server 160 accepts the call by sending back to the MSC 120 an ISUP Address Complete Message ("ACM") followed, at step 420, by an Answer Message ("ANM"). The "ACM" is used as an acknowledgement. The "ANM" indicates to the other end that the first end has "lifted the receiver" (i.e., it is ready to exchange data).

A voice connection is then established between the wireless user 100 and the VAD server 160 through voice links 105, 115 and 125 (step 422). At step 424, the user 100 is prompted by the VAD server 160 to interact with the VAD service. During this step, the user 100 will hear a prompt asking for a command. If the user 100 wants to use the "Name dialing" option, he will utter the name dialing command (e.g. "Call") and will then be asked to say a name. If the user 100 rather wishes to use the "Number dialing" option, he will utter the number dialing command (e.g. "Dial number") and will then be asked to say a number. The user 100 then speaks a name (or number). This utterance is compared against entries previously stored in the callers VAD directory using speaker-trained speech recognition technology. When a speech utterance is recognized and the telephone number associated with the utterance is retrieved (step 426) by the VAD server 160, an ISUP Facility Request ("FAR") message is sent over the SS7 Network 127 and 157 from the VAD server 160 to the MSC 120 (step 428). The DN (telephone number of the land terminal 170), to transfer the call to the land terminal 170, is supplied by the VAD server 160 in the "FAR" message. The "FAR" message is a redirection command sent along the voice connection and constitutes a call session management output signal.

The MSC 120 then sends back an ISUP Facility Accept ("FAA") message over the SS7 Network 127 and 157 to the VAD server 160 (step 430) to indicate that it accepts the request. At step 432, the MSC 120 sends an ISUP RELease ("REL") message to the VAD server 160 over the SS7 network 127 and 157 to instruct the VAD server 160 to release the trunk providing the voice connection between the respective ends. At step 434, the VAD server 160 acknowledges this request by sending an ISUP ReLease Complete "("PLC") message over the SS7 network 127 and 157 to the MSC 120 and releases its end of the trunk. At step 436, the MSC 120 may then extend the call based on the supplied called party number provided in step 424. The user 100 then hears regular progress tones (step 438) and the voice connection is established between the user 100 and the land terminal 170 through voice links 105, 115, 135 and 145 (step 440). Finally, the MSC 120 creates, at step 442, a biling record B that is stored in the billing records database 230.

The billing records A in the billing records database 230 are accounts of all the voice communications (e.g., time, duration, parties involved, etc.) that took place between the user 100 and the VAD server 160 for the purposes of using the voice-activated services. It will be up to the Telephone Company to determine whether or not it will charge these calls to its clients. Since the records are easily identifiable, it will be easy for the Telephone Company to filter them so that they are not included on the clients' bills. The billing records B in the billing records database 230 are accounts of all the voice communications (e.g., time, duration, parties involved, etc.) that took place between the user 100 and the land terminal 170 as if they had been entered through a keypad. This is one of the advantages of this invention over prior art. In prior art systems, the first record would be from the user 100 to the VAD server 160 and the second record from the VAD server to the Land Terminal 170. In order to bill the client correctly, both records need to be accessed and correlated. This may be quite difficult in some circumstances.

The above description of a preferred embodiment of the present invention should not be read in a limitative manner as refinements and variations are possible without departing from the spirit of the invention. The scope of the invention is defined in the appended claims and their equivalents.

We claim:

1. A switch for use in a telecommunications network, said switch including:
   an input through which a call session originating at an originating terminal in the telecommunications network can be established permitting the transport of voice signals;
   an output through which the call session established through said input can be routed toward a voice assisted services server;
   said switch being responsive to a call session management signal issued by the voice assisted services server that is indicative of a command to redirect the call session toward a destination other than the voice assisted services server to terminate a connection between said output and the voice assisted services server supporting the call session before the command to redirect the call session is implemented.

2. A switch as defined in claim 1 wherein said switch includes a processing unit for processing the call session management signal to extract therefrom an identifier of the destination other than the voice assisted services server.

3. A switch as defined in claim 2, wherein the identifier is a telephone number of the destination other than the voice assisted services server.

4. A switch as defined in claim 1, wherein the connection between said output and the voice assisted services server includes a voice connection and a signaling connection.

5. A switch as defined in claim 4, wherein said switch receives the command to redirect the call session toward a destination other than the voice assisted services server on the signaling connection.

6. A switch as defined in claim 4, wherein said switch is operative to issue a command on the signaling connection to terminate the connection between said output and the voice assisted services server on the voice connection.

7. A voice assisted services server for use in a telecommunications network, said voice assisted services server including:
   an input through which a call session originating at an originating terminal in the telecommunications network can be established permitting the transport of voice signals;
   said voice assisted services server being responsive to a signal applied at said input and derived from a spoken utterance formulated at the originating terminal to generate and output a call session management output signal, said call session management output signal being usable by a switch of the telecommunications network associated with the call session to manage the call session in dependence of said call session management output signal;
   said server subsequent the generation and the output of the call session management output signal being responsive to a signal issued by the switch to terminate a connection supporting the call session originating at the originating terminal.

8. A voice assisted services server as defined in claim 7, wherein said server is a voice dialing server.

9. A voice assisted services server as defined in claim 8, wherein said server is responsive to the spoken utterance to generate an identifier of a destination in the telecommunications network toward which the call session associated with the switch can be directed.

10. A voice assisted services server as defined in claim 9, wherein the identifier of a destination in the telecommunications network toward which the call session associated with the switch can be directed is a telephone number.

11. A voice assisted services server as defined in claim 10, wherein said telephone number is included in said call session management signal.

12. A voice assisted services server as defined in claim 11, wherein said call session management signal is indicative of a command to be implemented by the switch to redirect the call session toward the destination in the telecommunications network designated by the telephone number.

13. A voice assisted services server as defined in claim 12, wherein said server includes a speech recognition layer to generate a transcription of the spoken utterance.

14. A voice assisted services server as defined in claim 13, wherein said server includes a database mapping a global set of transcriptions a user is susceptible to utter with corresponding telephone numbers.

15. A switching center for use in a telecommunications network, said switching center including:
   an input through which a call session originating at an originating terminal in the telecommunications network can be established permitting the transport of voice signals;
   a first output through which the call session established through said input can be routed toward a voice assisted services server;

a second output through which the call session can be redirected toward another destination in the telecommunications network;

a processing unit for generating a first billing record for a section of the call session associated with the voice assisted services server and a second billing record for a section of the call session associated with another destination;

a computer readable storage medium for recording said first billing record and said second billing record;

said switching center being responsive to a call session management signal issued by the voice assisted services server that is indicative of a command to redirect the call session toward said second output to terminate a connection with the voice assisted services server.

16. A switching center as defined in claim 15, wherein said processing unit is operative to begin generation of said first billing record during call set-up of the calling session toward the voice assisted services.

17. A switching center as defined in claim 15, wherein said processing unit is responsive to redirection of the calling session through said second output to begin generation of said second billing record.

18. A switching center as defined in claim 15, wherein said processing unit provides means for marking said first billing record with an identifier indicative of an interaction with the voice assisted services server.

19. A method for management of calls involving voice activated dialing services:

establishing a first voice connection between an originating terminal in a telecommunications network and a switch of the telecommunications network;

establishing a second voice connection between said switch and a voice activated dialing server;

establishing a signaling connection between said switch and said voice activated dialing server;

processing at said voice activated dialing server a voice signal representative of a spoken utterance formulated at said originating terminal and transported to said voice activated dialing server over said first and second voice connections to generate on the basis of the spoken utterance an identifier of a destination terminal in the telecommunications network a user at said originating terminal is desirous of calling;

transmitting said identifier over said signaling connection toward said switch;

processing said identifier at said switch to establish a third voice connection between said switch and the destination terminal, thereby allowing transport of voice signals between said originating terminal and said destination terminal;

releasing said second voice connection.

20. A method for managing a call session involving voice assisted services, said method comprising the steps of:

establishing a call session between an originating terminal in the telecommunications network and a voice assisted services server, said call session being managed by a switch in the telecommunications network;

generating at the voice assisted services server on a basis of a spoken utterance formulated at the originating terminal a call session management signal indicative of a call session management event to be implemented at the switch;

transmitting to the switch said call session management signal;

managing said call session in dependence upon said call session management signal;

releasing a connection between the switch and the voice assisted services server supporting the call session between the voice assisted services server and said originating terminal, following reception of said call session management signal by said switch.

21. A method as defined in claim 20, wherein said call session management signal issued by the voice assisted services server is indicative of a command to be implemented by the switch to redirect the call session toward a destination other than the voice assisted services server.

22. A method as defined in claim 21, comprising the step of embedding in said call session management signal at the voice assisted services server an identifier of the destination other than the voice assisted services server.

23. A method as defined in claim 21, including the step of extracting at the switch from said call session management signal said identifier of the destination other than the voice assisted services server and processing said identifier to redirect said call session toward the destination other than the voice assisted services server.

24. A method as defined in claim 23, wherein said identifier is a telephone number of the destination other than the voice assisted services server.

25. A method as defined in claim 20, wherein the connection between the switch and the voice assisted services server includes a voice connection and a signaling connection.

26. A method for remotely managing a call session under the control of a switch in a telecommunications network, the call session being established from an originating terminal in the telecommunications network, said method comprising:

receiving at a location remote from the switch a voice signal representative of a spoken utterance formulated at the originating terminal;

processing the voice signal at said location to generate a call session management signal indicative of a call session management event to be implemented at the switch, said call session management signal being usable by the switch to effect managing of the call session in dependence upon said call session management signal;

terminating a connection supporting the call session originating at the originating terminal in response to a signal issued by the switch.

27. A method for generating billing data regarding usage of a telecommunications network during a call session, said method comprising:

establishing a call session between an originating terminal and a voice assisted services server permitting a user at the originating terminal to interact with the voice assisted services server;

generating a first billing record for a portion of the call session involving the voice assisted services server;

redirecting the call session toward a destination other than the voice assisted services server;

generating a second billing record for a portion of the call session involving the destination other than the voice assisted services server;

terminating a connection with the voice assisted services server in response to a call session management signal issued by the voice assisted services server that is indicative of a command to redirect the call session toward a destination other than the voice assisted services server.

* * * * *